United States Patent
Ronen et al.

(10) Patent No.: US 8,898,446 B2
(45) Date of Patent: Nov. 25, 2014

(54) POWER OVER ETHERNET EXTENDER SUITABLE FOR USE WITH MULTIPLE POWERING ARRANGEMENTS

(75) Inventors: Sani Ronen, Newe Yaraq (IL); Yaniv Giat, Modiin (IL); Nadav Gleit, Ramat Hasharon (IL)

(73) Assignee: Microsemi Corp.—Analog Mixed Signal Group, Ltd., Hod Hasharon (IL)

( * ) Notice: Subject to any disclaimer, the term of this patent is extended or adjusted under 35 U.S.C. 154(b) by 987 days.

(21) Appl. No.: 12/972,585

(22) Filed: Dec. 20, 2010

(65) Prior Publication Data
US 2011/0163605 A1    Jul. 7, 2011

Related U.S. Application Data

(60) Provisional application No. 61/292,183, filed on Jan. 5, 2010.

(51) Int. Cl.
*H02J 1/00*        (2006.01)
*H04L 12/10*    (2006.01)
*H04L 12/00*    (2006.01)
*H04L 12/40*    (2006.01)
*H04L 12/02*    (2006.01)
*G06F 1/26*        (2006.01)
*G06F 1/30*        (2006.01)
*G06F 1/28*        (2006.01)

(52) U.S. Cl.
CPC ............... *H04L 12/10* (2013.01); *H04L 12/00* (2013.01); *H04L 12/40039* (2013.01); *H04L 12/02* (2013.01); *G06F 1/266* (2013.01); *G06F 1/30* (2013.01); *G06F 1/28* (2013.01); *G06F 1/305* (2013.01)
USPC ........... 713/100; 713/310; 713/320; 713/321; 713/322; 713/323; 713/324; 713/330; 713/340; 307/1; 307/71; 307/38; 455/343.4

(58) Field of Classification Search
CPC ... H04L 12/40039; H04L 12/10; H04L 12/00; H04L 12/02; G06F 1/28; G06F 1/30
USPC ............ 307/71, 4, 80; 713/340, 300; 726/34; 379/413, 399.01; 375/211; 324/713; 438/61; 370/241, 217; 455/572, 402
See application file for complete search history.

(56) References Cited

U.S. PATENT DOCUMENTS 6,473,608 B1 * 10/2002 Lehr et al. ............... 455/402
7,299,368 B2 * 11/2007 Peker et al. ............... 713/300
(Continued)

OTHER PUBLICATIONS

IEEE 802.3af—2003, pp. 29-57, 94-96, 102 and 115, published Jun. 18, 2003 by The Institute of Electrical and Electronics Engineers, Inc., New York.

(Continued)

*Primary Examiner* — Rexford Barnie
*Assistant Examiner* — Elim Ortiz
(74) *Attorney, Agent, or Firm* — Simon Kahn

(57) ABSTRACT

A power over Ethernet extender arranged to detect if power is received over 2 pairs of wires or over 4 pairs of wires. If power is received over 4 pairs of wires, power is output over only 2 pairs of wires. Preferably, the power signature of the received power is further detected. If the incoming power over a first 2 pairs of wires supports in excess of 13 watts of power consumption, and power is received over 4 pairs, then the output power supports in excess of 13 watts of power consumption; and if the incoming power over a first 2 pairs of wires supports in excess of 13 watts of power consumption, and power is not received over 4 pairs, then the output power does not support in excess of 13 watts of power consumption.

18 Claims, 3 Drawing Sheets

| 2/4 DETECTOR | AT/AF DETECTOR | OUTPUT POWER |
|---|---|---|
| 2 PAIR | TYPE 1 (< 13 WATT) | LIMITED TYPE 1 (<< 13 WATT) |
| 2 PAIR | TYPE 2 (> 13 WATT) | TYPE 1 (< 13 WATT) |
| 4 PAIR | TYPE 1 (< 13 WATT) | LIMITED TYPE 2 (> 13 WATT); OPTIONALLY TYPE 1 (< 13 WATT) |
| 4 PAIR | TYPE 2 (> 13 WATT) | TYPE 2 (> 13 WATT) |

(56) References Cited

U.S. PATENT DOCUMENTS

| | | | |
|---|---|---|---|
| 7,460,889 B2* | 12/2008 | Darshan et al. | 455/572 |
| 7,466,819 B2* | 12/2008 | Lehr et al. | 379/399.01 |
| 7,492,059 B2* | 2/2009 | Peker et al. | 307/71 |
| 7,711,967 B2* | 5/2010 | Woo et al. | 713/300 |
| 7,724,650 B2* | 5/2010 | Karam | 370/217 |
| 7,849,343 B2* | 12/2010 | Ferentz et al. | 713/340 |
| 7,903,809 B2* | 3/2011 | Karam | 379/413 |
| 8,411,575 B2* | 4/2013 | Karam | 370/241 |
| 2006/0082220 A1* | 4/2006 | Karam et al. | 307/4 |
| 2006/0263925 A1* | 11/2006 | Chandler | 438/61 |
| 2010/0180350 A1* | 7/2010 | Glaubert | 726/34 |
| 2010/0182024 A1* | 7/2010 | Yu | 324/713 |
| 2011/0085584 A1* | 4/2011 | Wei et al. | 375/211 |
| 2013/0257161 A1* | 10/2013 | Ferentz et al. | 307/80 |

OTHER PUBLICATIONS

IEEE 802.3at—2009, pp. 22-67; published Oct. 30, 2009 by The Institute of Electrical and Electronics Engineers, Inc , New York.

Extricom EXRE-10 Power Over Ethernet Range Extender Data Sheet, published 2007 by Extricom.

Outreach Ethernet and POE Extender Data Sheet, published by Veracity UK Ltd, Ayr. UK, 2008.

Ethernet Booster CopperLink Model 2110 Data Sheet, published by Patton of Gaithersburg, MD, 2009.

\* cited by examiner

| 2/4 DETECTOR | AT/AF DETECTOR | OUTPUT POWER |
|---|---|---|
| 2 PAIR | TYPE 1 (< 13 WATT) | LIMITED TYPE 1 (<< 13 WATT) |
| 2 PAIR | TYPE 2 (> 13 WATT) | TYPE 1 (< 13 WATT) |
| 4 PAIR | TYPE 1 (< 13 WATT) | LIMITED TYPE 2 (> 13 WATT); OPTIONALLY TYPE 1 (< 13 WATT) |
| 4 PAIR | TYPE 2 (> 13 WATT) | TYPE 2 (> 13 WATT) | und POWER OVER ETHERNET EXTENDER SUITABLE FOR USE WITH MULTIPLE POWERING ARRANGEMENTS

CROSS-RELFERENCE TO RELATED APPLICATION

This application claims priority from U.S. Provisional Patent Application Ser. No. 61/292,183 filed Jan. 5, 2010 entitled "Power over Ethernet Extender Suitable for Use with Multiple Powering Arrangements", the entire contents of which is incorporated herein by reference.

TECHNICAL FIELD

The present invention relates to the field of power over Ethernet (PoE), and particularly to a PoE extender arranged to output a reduced power in respect to the received input power.

BACKGROUND

Data networks in accordance with IEEE 802.3, as published by the Institute of Electrical and Electronics Engineers, Inc., New York, and commonly known as Ethernet networks, are restricted to a data path length of about 100 meters between data terminal equipment (DTE) units, in the event that the data transfer medium is constituted of unshielded twisted wire pairs. Power over Ethernet (PoE), in accordance to IEEE 802.3af-2003 published by the Institute of Electrical and Electronics Engineers, Inc., New York, the entire contents of which is incorporated herein by reference, is delivered over a set of 2 twisted wire pairs, and is limited to delivering less than about 13 watts for consumption by a powered device (PD). Enhanced PoE, in accordance with IEEE 802.3at-2009 published by the Institute of Electrical and Electronics Engineers, Inc., New York, the entire contents of which is incorporated herein by reference, is delivered over a set of 2 twisted wire pairs, and allows for delivering in excess of 13 watts for consumption by the PD. In either case, both power and data are delivered over a single cable of twisted wire data pairs, and in order to ensure that data is delivered without excess distortion the distance between two data terminal equipments (DTEs) on a link is limited to a range of 100 meters.

The above mentioned IEEE 802.3af-2003 and IEEE 802.3at-2009 standards are restricted to delivering power over a single set of 2 twisted wire pairs. Various strategies to deliver power over all 4 twisted wire pairs have been disclosed in U.S. Pat. No. 7,492,059 issued Feb. 17, 2009 to Peker et al.; U.S. Pat. No. 7,299,368 issued Nov. 20, 2008 to Peker et al; and U.S. Pat. No. 7,460,889 issued Dec. 2, 2008 to Darshan et al, the entire contents of all of which are incorporated herein by reference.

U.S. Pat. No. 7,466,819 issued Dec. 16, 2008 to Lehr et al, teaches that a hub equipment, such as a switch, bridge or router, may receive power over the communication cabling, and forward some of the power to a DTE, thus enabling an extension of powering and data communication in excess of the aforementioned 100 meter limit. Commercially available devices implementing such technology are readily available, and are typically known as PoE extenders.

Unfortunately, commercially available PoE extenders are extremely limited, and do not take advantage of the ability to deliver power over all 4 pairs of wires. As a result, the 100 meter limit is only stretched by an additional 100 meters.

SUMMARY

In view of the discussion provided above and other considerations, the present disclosure provides methods and apparatus to overcome some or all of the disadvantages of prior and present PoE extenders and methods. Other new and useful advantages of the present methods and apparatus will also be described herein and can be appreciated by those skilled in the art.

This is provided in certain embodiments by a PoE extender arranged to receive power over either two twisted wire pairs or over all four twisted wire pairs, and detect whether power is delivered over all four twisted wire pairs, or only over two twisted wire pairs. In the event that power is delivered over all four twisted wire pairs, the power is combined and output over a single pair of twisted wire pairs. The power signature is further examined, and the output power signature is determined responsive the examined received power signature.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
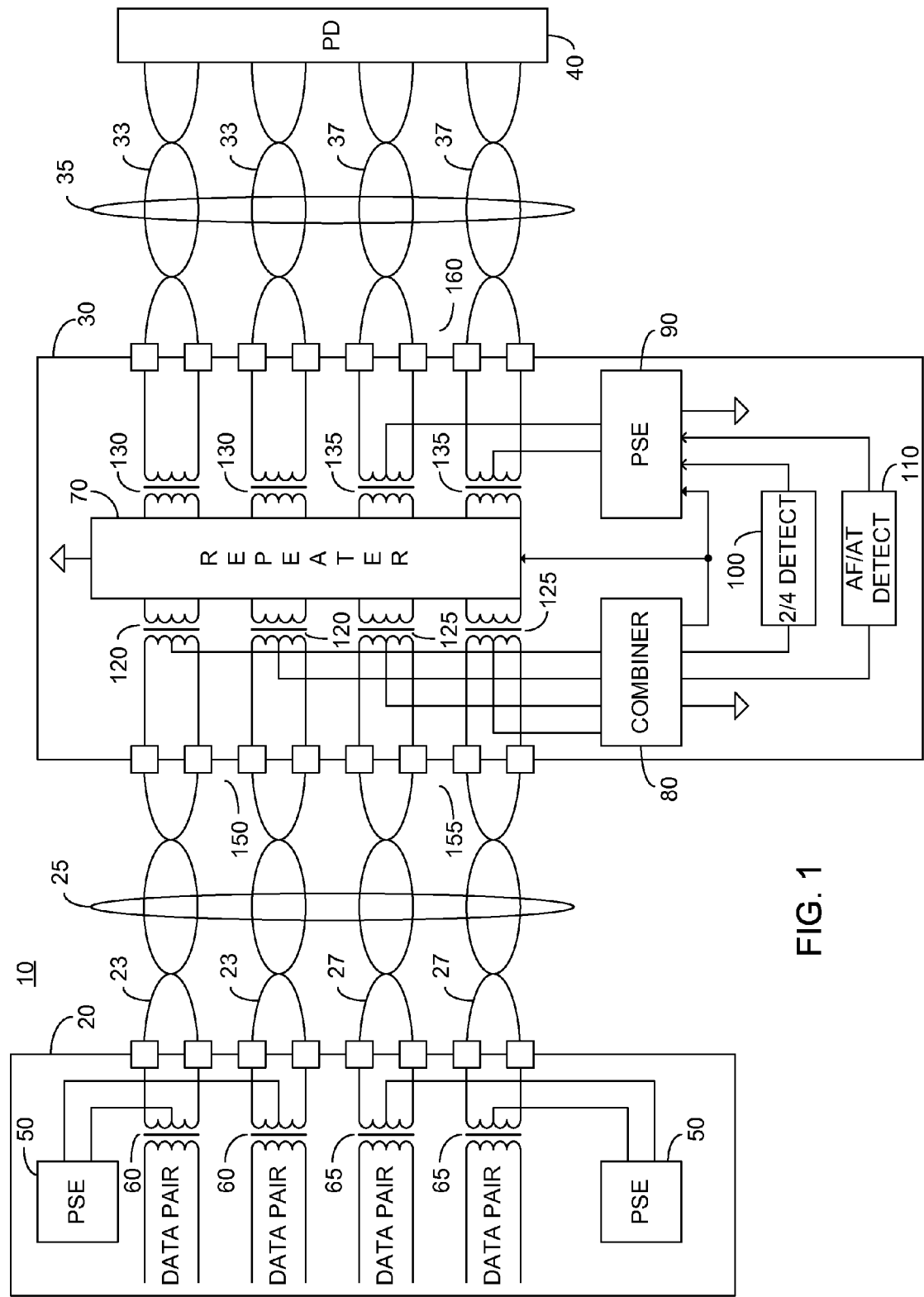
FIG. 1 illustrates a high level schematic diagram of a network comprising a power over Ethernet extender according to certain embodiments.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors and inductors does not exceed the scope thereof.

FIG. 1 illustrates a high level schematic diagram of a network 10 comprising: a hub equipment 20, illustrated as a DTE such as a switch; a first structured cable 25 comprising a first pair of twisted wire pairs 23 and a second pair of twisted wire pairs 27; a PoE extender 30; a second structured cable 35 comprising a third pair of twisted wire pairs 33 and a fourth pair of twisted wire pairs 37; and a powered device (PD) 40, illustrated as a DTE to be powered. Hub equipment 20 comprises: one or more first power sourcing equipments (PSE) 50; a first pair of data transformers 60; and a second pair of data transformers 65. PoE extender 30 comprises: a data repeater 70; a combiner 80; a second PSE 90; a 2/4 detector 100; a power type detection circuit 110, hereinafter embodied as an AF/AT detector; a third pair of data transformers 120; a fourth pair of data transformers 125; a fifth pair of data transformers 130; and a sixth pair of data transformers 135; a first input port 150; a second input port 155; and an output port 160. In an exemplary embodiment first pair of data transformers 60, second pair of data transformers 65, third pair of data transformers 120, fourth pair of data transformers 125, fifth pair of data transformers 130 and sixth pair of data transformers 135 are constituted of identically specified data transformers.

In one embodiment first PSE 50 is constituted of either a PSE meeting the above mentioned IEEE 802.3af-2003 standard, also known as a Type 1 PSE, or a PSE meeting the above mentioned IEEE 802.3at-2009 standard, also known as a Type 2 PSE. In accordance with the IEEE standard 802.3at-2009 standard, first PSE 50, when constituted of a Type 2 PSE, exhibits a classification signature identifying itself as a Type 2 PSE. In one embodiment second PSE 90 comprises a DC/DC converter, thereby allowing for output of a predetermined voltage from second PSE 90 regardless of the input voltage received from first PSE 50, irrespective as to whether first PSE 50 is of Type 1 or Type 2, and irrespective of the length of first structured cable 25. In one embodiment PD 40 is constituted of a PD meeting the above mentioned IEEE 802.3af-2003 standard, also known as a Type 1 PD, or a PD meeting the above mentioned IEEE 802.3at-2009 standard, also known as a Type 2 PD.

The output of a first PSE 50 is connected to a center tap connection of a first winding of a first transformer of first pair of data transformers 60, and the return connection of the first PSE 50 is connected to a center tap connection of a first winding of a second transformer of first pair of data transformers 60. The output of a second PSE 50 is connected to a center tap connection of a first winding of a first transformer of second pair of data transformers 65, and the return connection of the second PSE 50 is connected to a center tap connection of a first winding of a second transformer of second pair of data transformers 65. Both ends of a second winding of each transformer of first pair of data transformers 60 has connected thereto a data pair, and both ends of a second winding of each transformer of second pair of data transformer 65 has connected thereto a data pair.

Both ends of the first winding of each transformer of first pair of data transformers 60 are connected via a respective one of first pair of twisted wire pairs 23 to both ends of a first winding of a respective transformer of third pair of data transformers 120 via first input port 150, presenting a set of contacts for detachable connection to first pair of twisted wire pairs 23. Both ends of the first winding of each transformer of second pair of data transformers 65 are connected via a respective one of second pair of twisted wire pair 27 to both ends of a first winding of a respective transformer of fourth pair of data transformers 125 via second input port 155, presenting a set of contacts for detachable connection to second pair of twisted wire pairs 27.

Both ends of a second winding of each transformer of third pair of data transformers 120 and fourth pair of data transformer 125 are connected to a respective port of repeater 70. A center tap connection of the first winding of each transformer of third pair of data transformers 120 is connected to a respective input of combiner 80 and a center tap connection of the first winding of each transformer of fourth pair of data transformers 125 is connected to a respective input of combiner 80. A first output of combiner 80 is connected to a respective input of repeater 70 and to a first input of second PSE 90. A second output of combiner 80 is connected to the input of 2/4 detector 100 and a third output of combiner 80 is connected to the input of AF/AT detector 110. The output of 2/4 detector 100 is connected to a second input of second PSE 90 and the output of AF/AT detector 110 is connected to a third input of second PSE 90. The output of second PSE 90 is connected to a center tap connection of a first winding of a first transformer of sixth pair of data transformers 135, and the return connection of second PSE 90 is connected to a center tap connection of a first winding of a second transformer of sixth pair of data transformers 135. Each end of the second winding of each transformer of fifth pair of data transformers 130 and sixth pair of data transformer 135 is connected to a respective port of repeater 70. Each end of the first winding of each transformer of fifth pair of data transformers 130 is connected via a respective one of third twisted wire pairs 33 to respective inputs of PD 40. Each end of the first winding of each transformer of sixth pair of data transformers 135 is connected via output port 160 and a respective one of fourth twisted wire pairs 37 to respective inputs of PD 40.

In one embodiment, combiner 80 is implemented as described in U.S. Pat. No. 7,492,059 to Darshan, incorporated above by reference. In one embodiment, 2/4 detector 100 is arranged to detect the presence of a plurality of power signals within combiner 80, and an output an active signal only in the event that a plurality of power signals are detected. The connection between combiner 80 and 2/4 detector 100, and between combiner 80 and AF/AT detector 110 is illustrated as a logical connection, and in an exemplary embodiment either, or both, of the connections is comprised of a plurality of connections, each representing one of first input port 150 and second input port 155. In one particular embodiment, 2/4 detector 100 is implemented in discrete logic as part of combiner 80. In one embodiment, AF/AT detector 110 represents the output of a state machine, as described in IEEE 802.3at-2009 incorporated above by reference, arranged to detect the presence, or absence, of 2 event physical layer classification. In an exemplary embodiment, AF/AT detector 110 is implemented as part of combiner 80.

Figures 3, 4:
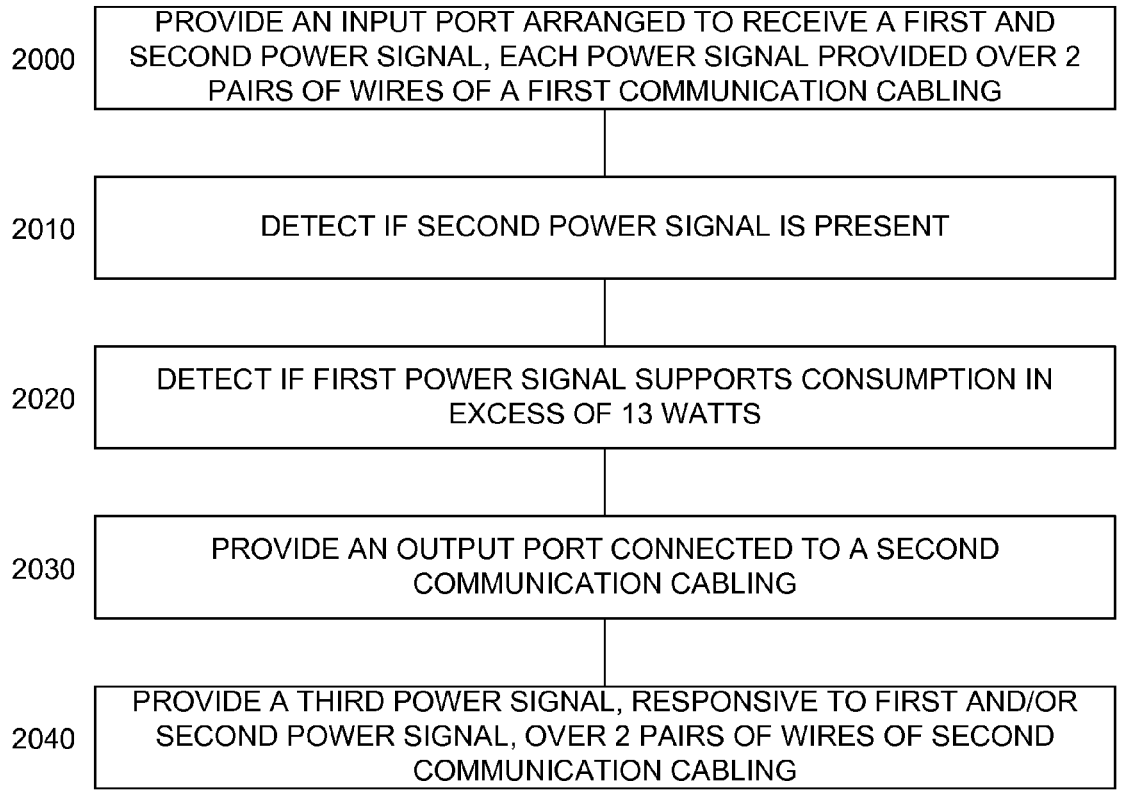
FIG. 3 illustrates a high level flow chart of a second method of extending power over Ethernet according to certain embodiments.
FIG. 4 illustrates a truth table of the values of the 2/4 detector and AF/AT detector of FIG. 1 with the resultant output power, according to certain embodiments.

FIG. 4 illustrates a truth table of the operation of second PSE 90 responsive to the various inputs received from 2/4 detector 100 and AF/AT detector 110, and thus the operation of FIG. 1 will be described in reference to FIG. 4. In operation, combiner 80 receives power from each present first PSE 50 over the respective combination of: first pair of data transformers 60, first pair of twisted wire pairs 23 and third pair of data transformers 120 via first input port 150; and second pair of data transformers 65, second pair of twisted wire pairs 27 and fourth pair of data transformers 125 via second input port 155. Combiner 80 combines the received power received from each input port and outputs the combined power to the power input of repeater 70 and to the power input of second PSE 90. 2/4 detector 100 is operative to detect if power is received over both first input port 150 and second input port 155, and in the event that power is received over both first input port 150 and second input port 155 assert a signal to second PSE 90. In the event that power is not received over both first input port 150 and second input port 155 the signal to second PSE 90 is not asserted by 2/4 detector 100.

AF/AT detector 110 is operative to detect if power received via fist input port 150 and second input port 155 presents a signature indicative that the associated first PSE 50 is a Type 1 PSE or a Type 2 PSE. AF/AT detector 110 outputs a signal responsive to the identified PSE type. In an exemplary embodiment, only a single power type is identified. Thus in the exemplary embodiment, both first PSEs 50, if present, are presumed to be of the same type, i.e. of Type 1 or of Type 2. Data repeater 70 is operative to repeat data transferred between hub equipment 20 and PD 40.

In the event that 2/4 detector 100 detects that only a single first PSE 50 is supplying power, i.e. that power is detected only via one of first input port 150 and second input port 155, and AF/AT detector 110 detects that the first PSE 50 supplying the detected power is a Type 1 PSE, as illustrated in the first row of the table of FIG. 4, second PSE 90 provides power to PD 40 via output port 160, and outputs a classification signature indicating that the power transmitted through fourth pair of twisted wire pairs 37 coupled to output port 160 supports power consumption less than 13 watts. In particular, in the event that PD 40 requests power in excess of about 13 watts less the amount of power drawn by repeater 70, PSE 90 will not supply power to PD 40.

In the event that 2/4 detector 100 detects that only a single first PSE 50 is supplying power, i.e. that power is detected only via one of first input port 150 and second input port 155, and AF/AT detector 110 detects that first PSE 50 supplying the detected power is a Type 2 PSE, as illustrated in the second row of the table of FIG. 4, second PSE 90 provides power to PD 40 via output port 160, and outputs a classification signature indicating that the power transmitted through fourth pair of twisted wire pairs 37 coupled to output port 160 does not support power consumption in excess of 13 watts, i.e. the output classification signature is a Type 1 classification signature.

In the event that 2/4 detector 100 detects that two first PSEs 50 are actively supplying power, i.e. power is detected as being received via both first input port 150 and second input port 155, and AF/AT detector 110 detects that at least one of the first PSEs 50 is a Type 1 PSE, as illustrated in the third row of the table of FIG. 4, second PSE 90 provides power to PD 40 via output port 160, and outputs a classification signature indicating that the power transmitted through fourth pair of twisted wire pairs 37 supports power consumption in excess of 13 watts, i.e. the output classification signature is a Type 2 classification signature. While the output signature is of a Type 2 classification, the amount of requested power which may be supported is limited by the amount of power received via first input port 150 and second input port 155, less the power consumption of repeater 70. Thus, in the event that PD 40 requests the maximum amount of power allowed by a type 2 PD, PSE 90 may refuse to supply power to PD 40. In an alternative embodiment, after refusing to supply power to PD 40, PSE 90 performs an additional detection stage and outputs a classification signature indicating that the power transmitted through fourth pair of twisted wire pairs 37 coupled to output port 160 does not support power consumption in excess of 13 watts, i.e. the output classification signature is a Type 1 classification signature. In yet another alternative embodiment, PSE 90 outputs a classification signature indicating that the power transmitted through fourth pair of twisted wire pairs 37 coupled to output port 160 does not support power consumption in excess of 13 watts, i.e. the output classification signature is a Type 1 classification signature.

In the event that 2/4 detector 100 detects that two first PSEs 50 are actively supplying power, i.e. power is detected as being received via both first input port 150 and second input port 155, and AF/AT detector 110 detects that at least one of the first PSEs 50 is a Type 2 PSE, as illustrated in the fourth row of the table of FIG. 4, second PSE 90 provides power to PD 40 via output port 160, and outputs a classification signature indicating that the power transmitted through fourth pair of twisted wire pairs 37 coupled to output port 160 supports power consumption in excess of 13 watts, i.e. the output classification signature is a Type 2 classification signature. Advantageously, second structured cable 35 can be connected to an additional PoE extender 30, thus extending the range of power and data communication by an additional 100 meters.

Figure 2:
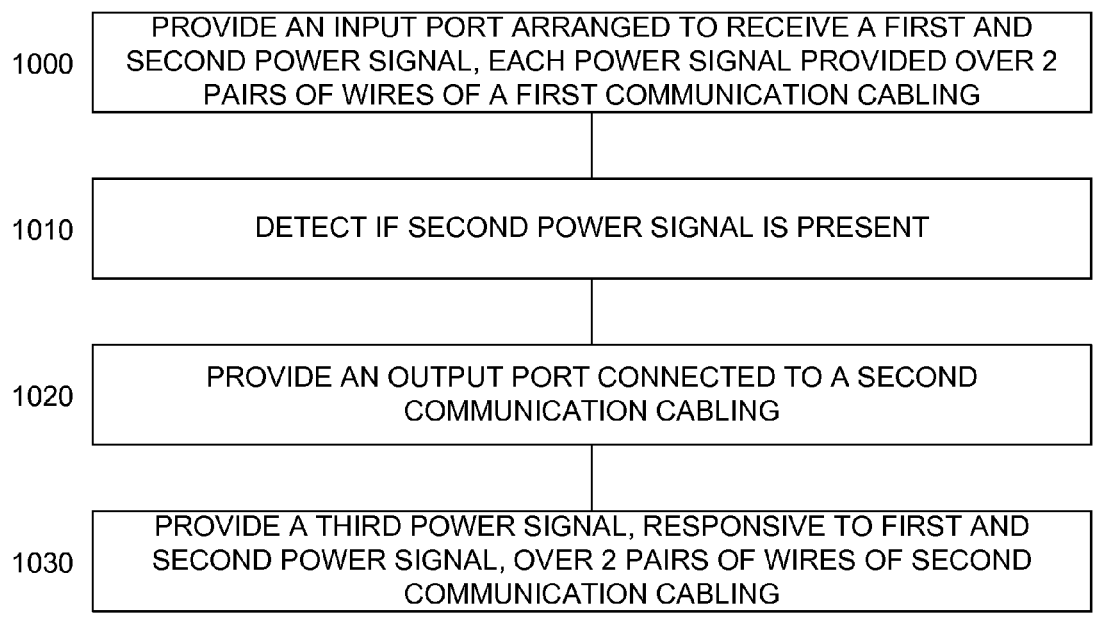
FIG. 2 illustrates a high level flow chart of a method of extending power over Ethernet according to certain embodiments.

FIG. 2 illustrates a high level flow chart of a first method of extending power over Ethernet according to certain embodiments. In stage 1000, an input port is provided, such as the combination of first input port 150 and second input port 155, arranged to receive a first and a second power signal. Each of the first and second power signals is provided by a respective first PSE 50 over 2 twisted wire pairs of a first communication cabling, such as first pair of twisted wire pairs 23 and second pair of twisted wire pairs 27. In stage 1010 the second power signal is detected as present or absent, i.e. are the first and second power signals both present. In stage 1020, an output port is provided, such as output port 160 arranged for detachable connection to a second communication cabling, such as second structured cable 35.

In stage 1030, in the event that in stage 1010 the second power signal is detected as being present, a third power signal is output from the output port of stage 1020 over 2 pairs of twisted wire pairs of the second communication cabling of stage 1020, such as fourth pair of twisted wire pairs 37. The third power signal is provided responsive to the first and second power signals, the power consumption supported by the third power signal being a function of the combined power consumption supported by the first and second power signals.

FIG. 3 illustrates a high level flow chart of a second method of extending power over Ethernet according to certain embodiments. In stage 2000, an input port is provided, such as the combination of first input port 150 and second input port 155, arranged to receive a first and a second power signal. Each of the first and second power signals is provided by a respective first PSE 50 over 2 twisted wire pairs of a first communication cabling, such as first pair of twisted wire pairs 23 and second pair of twisted wire pairs 27. In stage 2010 the second power signal is detected as present or absent, i.e. are the first and second power signals both present. In stage 2020 the first power signal is analyzed to detect if the first power signal supports power consumption in excess of 13 watts. In stage 2030, an output port is provided, such as output port 160 arranged for detachable connection to a second communication cabling, such as second structured cable 35.

In stage 2040, a third power signal is output from the output port of stage 2030 over 2 pairs of twisted wire pairs of the second communication cabling of stage 2030, such as fourth pair of twisted wire pairs 37. In the event that in stage 2010 the second power signal was detected as being present, the third power signal is provided responsive to the first and second power signals, the power consumption supported by the third power signal being a function of the combined power consumption supported by the first and second power signals. Furthermore, the third power signal is provided with a classification signature responsive to the power consumption supported by the first power signal.

In particular, in the event that in stage 2020 the first power signal is detected as supporting power consumption in excess of 13 watts, and in stage 2010 the second power signal is detected as present, the classification signature associated with the third power signal exhibits a Type 2 classification signature. In the event that in stage 2020 the first power signal is detected as not supporting power consumption in excess of 13 watts, and in stage 2010 the second power signal is detected as present, the classification signature attached to the third power signal is preferably a Type 2 classification signature with limited powering abilities. Alternately, the third power signal is exhibits a Type 1 classification signature. In yet another embodiment, the third classification signature attached to the third power signal is a Type 2 classification signature, and in the event that the PD requests more power than is available, power is not supplied, and detection is again performed followed by the third power signal which then exhibits a Type 1 classification signature.

In the event that in stage 2010 the second power signal is not detected as present, the third power signal is provided responsive to the first power signal, the power consumption supported by the third power signal being a function of the power consumption supported by the first power signal. Furthermore, the third power signal is provided with a classification signature responsive to the power consumption supported by the first power signal. In particular, in the event that in stage 2020 the first power signal is detected as supporting power consumption in excess of 13 watts, and in stage 2010 the second power signal is not detected as present, the classification signature associated with the third power signal is a Type 1 classification signature. In the event that in stage 2020 the first power signal is detected as not supporting power consumption in excess of 13 watts, and in stage 2010 the second power signal is not detected as present, the classification signature associated with the third power signal is a Type 1 classification signature. Furthermore, in the event that PD 40 requests power in excess of the Type 1 power received less power consumed by the PoE extender, PD 40 will not receive from second PSE 90.

Thus the present embodiments enable a power over Ethernet extender arranged to receive power over either two twisted wire pairs at the first input port or over all four twisted wire pairs of a communication cabling, i.e over both the first input port and the second input port, and detect whether power is delivered over all four twisted wire pairs, or only over two twisted wire pairs. In the event that power is delivered over all four twisted wire pairs, the power is combined and output over a single pair of twisted wire pairs. In one embodiment, a classification signature is attached to the output power, the classification signature being responsive to: the detection of whether power is delivered over all four twisted wire pairs or only two twisted wire pairs; and the type of power received over all four or only two twisted wire pairs.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A power over Ethernet extender comprising:
    a first input port arranged to receive a first power signal over a first set of 2 pairs of wires of a first communication cabling connected to said first input port;
    a second input port arranged to receive a second power signal over a second set of 2 pairs of wires of the first communication cabling connected to said second input port;
    a power type detection circuit arranged to detect if the first power signal supports power consumption in excess of 13 watts;
    a detection circuit arranged to detect if both the first power signal and the second power signal are present;
    a power sourcing equipment in communication with said first input port, said second input port, said power type detection circuit and said detection circuit; and
    an output port arranged to transmit a third power signal output by said power sourcing equipment to a second communication cabling connected to the output port,
    said power sourcing equipment arranged to:
    in the event that said detecting circuit has detected that the first power signal is present and the second power signal is not present, and said power type detection circuit has detected that the first power signal supports power consumption in excess of 13 watts, provide said third power signal derived from the first power signal over only a single set of 2 pairs of wires of the second communication cabling connected to said output port with a signature indicative that the third power signal does not support consumption in excess of 13 watts.

2. The power over Ethernet extender according to claim 1, wherein said power sourcing equipment is further arranged to:
    in the event that said detection circuit has detected that the first power signal is present and the second power signal is not present, and said power detection circuit has detected that the first power signal does not support power consumption in excess of 13 watts, provide said third power signal derived from the first power signal over only the single set of 2 pairs of wires of said second communication cabling with a signature indicative that the third power signal does not support consumption in excess of 13 watts.

3. The power over Ethernet extender according to claim 1, wherein said power sourcing equipment is further arranged to:
    in the event that said detection circuit has detected that both the first power signal and the second power signal are present, and said power detection circuit has detected that the first power signal supports power consumption in excess of 13 watts, provide said third power signal derived from the first power signal and the second power signal over only the single set of 2 pairs of wires of said second communication cabling with a signature indicative that the third power signal supports consumption in excess of 13 watts.

4. The power over Ethernet extender according to claim 1, wherein said power sourcing equipment is further arranged to:
in the event that said detection circuit has detected that both the first power signal and the second power signal are present, and aid power detection circuit has detected that the first power signal does not support power consumption in excess of 13 watts, provide said third power signal derived from the first power signal and the second power signal over only the single set of 2 pairs of wires of said second communication cabling with a signature indicative that the third power signal does not support power consumption in excess of 13 watts.

5. The power over Ethernet extender according to claim 1, wherein said power sourcing equipment is further arranged to:
in the event that said detection circuit has detected that both the first power signal and the second power signal are present, and said power detection circuit has detected that the first power signal does not support power consumption in excess of 13 watts, provide said third power signal derived from the first power signal and the second power signal over only the single set of 2 pairs of wires of said second communication cabling with a signature indicative that the third power signal supports power consumption in excess of 13 watts.

6. The power over Ethernet extender according to claim 1, wherein said power sourcing equipment is further arranged to:
in the event that said detection circuit has detected that the first power signal is present and the second power signal is not present, and said power detection circuit has detected that the first power signal does not support power consumption in excess of 13 watts, provide said third power signal derived from the first power signal over only the single set of 2 pairs of wires of said second communication cabling with a signature indicative that the third power signal does not support consumption in excess of 13 watts;
in the event that said detection circuit has detected that both the first power signal and the second power signal are present, and said power detection circuit has detected that the first power signal does not support power consumption in excess of 13 watts, provide said third power signal derived from the first power signal and the second power signal over only the single set of 2 pairs of wires of said second communication cabling with a signature indicative that the third power signal does not support power consumption in excess of 13 watts; and
in the event that said detection circuit has detected that both the first power signal and the second power signal are present, and said power detection circuit has detected that said first power signal supports power consumption in excess of 13 watts, provide said third power signal derived from the first power signal and the second power signal over only the single set of 2 pairs of wires of said second communication cabling with a signature indicative that the third power signal supports consumption in excess of 13 watts.

7. The power over Ethernet extender according to claim 1:
in the event that said detection circuit has detected that the first power signal is present and the second power signal is not present, and said power detection circuit has detected that the first power signal does not support power consumption in excess of 13 watts, provide said third power signal derived from the first power signal over only the single set of 2 pairs of wires of said second communication cabling with a signature indicative that the third power signal does not support consumption in excess of 13 watts;
in the event that said detection circuit has detected that both the first power signal and the second power signal are present, and said power detection circuit has detected that the first power signal supports power consumption in excess of 13 watts, provide said third power signal derived from the first power signal and the second power signal over only the single set of 2 pairs of wires of said second communication cabling with a signature indicative the third power signal supports consumption in excess of 13 watts; and
in the event that said detection circuit has detected that both the first power signal and the second power signal are present, and said power detection circuit has detected that the first power signal does not support power consumption in excess of 13 watts, provide said third power signal derived from the first power signal and the second power signal over only the single set of 2 pairs of wires of said second communication cabling with a signature indicative that the third power signal supports power consumption in excess of 13 watts.

8. The power over Ethernet extender according to claim 1, wherein said power sourcing equipment is further arranged to:
in the event that said detection circuit has detected that both the first power signal and the second power signal are present, and said power detection circuit has detected that the first power signal supports power consumption in excess of 13 watts, provide said third power signal derived from the first power signal and the second power signal over only the single set of 2 pairs of wires of said second communication cabling with a signature indicative that the third power signal supports consumption in excess of 13 watts; and
in the event that said detection circuit has detected both the first power signal and the second power signal are present, and said power detection circuit has detected that the first power signal does not support power consumption in excess of 13 watts, provide said third power signal derived from the first power signal and the second power signal over only the single set of 2 pairs of wires of said second communication cabling with a signature indicative that the third power signal does not support power consumption in excess of 13 watts.

9. The power over Ethernet extender according to claim 1, wherein said power sourcing equipment is further arranged to:
in the event that said detection circuit has detected that both the first power signal and the second power signal are present, and said power detection circuit has detected that the first power signal supports power consumption in excess of 13 watts, provide said third power signal derived from the first power signal and the second power signal over only the single set of 2 pairs of wires of said second communication cabling with a signature indicative that the third power signal support consumption in excess of 13 watts; and in the event that said detection circuit has detected that both the first power signal and the second power signal are present, and said power detection circuit has detected that the first power signal does not support power consumption in excess of 13 watts, provide said third power signal derived from the first power signal and the second power signal over only the single set of 2 pairs of wires of said second communication cabling with a signature indicative that the third power signal supports power consumption in excess of 13 watts.

10. A method of extending power over Ethernet, the method comprising:
providing a first input port arranged to receive a first power signal over a first set of 2 pairs of wires of a first communication cabling;
providing a second input port arranged to receive a second power signal over a second set of 2 pairs of wires of the first communication cabling;
detecting if both the first and second power signals are present at the provided input port;
detecting if the first power signal supports power consumption in excess of 13 watts;
providing an output port exhibiting a third set of contacts arranged to be connected to a second communication cabling; and
in the event that the first power signal is detected as present and the second power signals is not detected as present, and said first power signal is detected as supporting power consumption in excess of 13 watts providing a third power signal, derived from the first power signal over only a single set of 2 pairs of wires of the second communication cabling connected to the provided output port with a signature indicative that the third power signal does not support consumption in excess of 13 watts.

11. The method according to claim 10, further comprising:
in the event that the first power signal is detected as present and the second power signal is not detected as present, and said first power signal is detected as not supporting power consumption in excess of 13 watts, providing said third power signal derived from the first power signal over only the single set of 2 pairs of wires of the second communication cabling with a signature indicative that the third power signal does not support consumption in excess of 13 watts.

12. The method according to claim 10, further comprising:
in the event that both the first power signal and the second power signal are detected as present, and the first power signal is detected as supporting power consumption in excess of 13 watts, providing said third power signal derived from the first and second power signals over only the single set of 2 pairs of wires of the second communication cabling with a signature indicative that the third power signal supports consumption in excess of 13 watts.

13. The method according to claim 10, further comprising:
in the event that both the first power signal and the second power signal are detected as present, and the first power signal is detected as not supporting power consumption in excess of 13 watts, providing said third power signal derived from the first power signal and the second power signal over only the single set of 2 pairs of wires of the second communication cabling with a signature indicative that the third power signal does not support consumption in excess of 13 watts.

14. The method according to claim 10, further comprising:
in the event that both the first power signal and the second power signal are detected as present, and the first power signal is detected as not supporting power consumption in excess of 13 watts, providing said third power signal derived from the first power signal and the second power signal over only the single set of 2 pairs of wires of the second communication cabling with a signature indicative that the third power signal supports consumption in excess of 13 watts.

15. The method according to claim 10, further comprising:
in the event that the first power signal is detected as present and the second power signal is not detected as present, and the first power signal is detected as not supporting power consumption in excess of 13 watts, providing said third power signal derived from the first power signal over only the single set of 2 pairs of wires of the second communication cabling with a signature indicative that the third power signal does not support consumption in excess of 13 watts; and
in the event that both the first power signal and the second power signal are detected as present, and the first power signal is detected as not supporting power consumption in excess of 13 watts, providing said third power signal derived from the first power signal and the second power signal over only the single set of 2 pairs of wires of the second communication cabling with a signature indicative that the third power signal does not support consumption in excess of 13 watts; and
in the event that both the first power and the second power signal are detected as present, and the first power signal is detected as supporting power consumption in excess of 13 watts, providing said third power signal derived from the first power signal and the second power signal over only the single set of 2 pairs of wires of the second communication cabling with a signature indicative that the third power signal supports consumption in excess of 13 watts.

16. The method according to claim 10, further comprising:
in the event that the first power signal is detected a present and the second power signal is not detected as present, and the first power signal is detected as not supporting power consumption in excess of 13 watts, providing said third power signal derived from the first power signal over only the single set of 2 pairs of wires of the second communication cabling with a signature indicative that the third power signal does not support consumption in excess of 13 watts;
in the event that the first power signal and the second power are detected as present, and the first power signal is detected as not supporting power consumption in excess of 13 watts, providing said third power signal derived from the first and second power signals over only the single set of 2 pairs of wires of the second communication cabling with a signature indicative that the third power signal supports consumption in excess of 13 watts; and
in the event that both the first power signal and the second power signal are detected as present, and the first power signal is detected as not supporting power consumption in excess of 13 watts, providing said third power signal derived from the first power signal and the second power signal over only the single set of 2 pairs of wires of the second communication cabling with a signature indicative that the third power signal supports consumption in excess of 13 watts.

17. The method according to claim 10, further comprising:
in the event that both the first power signal and the second power signal are detected as present, and the first power signal is detected as supporting power consumption in excess of 13 watts, providing said third power signal derived from the first power signal and the second power signal over only the single set of 2 pairs of wires of the second communication cabling with a signature indicative that the third power signal supports consumption in excess of 13 watts; and
in the event that both the first power signal and the second power signal are detected as present, and the first power signal is detected as not supporting power consumption in excess of 13 watts, providing said third power signal derived from the first power signal and the second power signal over only the single set of 2 pairs of wires of the second communication cabling with a signature indicative that the third power signal does not support consumption in excess of 13 watts.

18. The method according to claim 10, further comprising:
in the event that both the first power signal is detected as present and the second power signal is detected as present, and the first signal is detected as supporting power consumption in excess of 13 watts, providing said third power signal derived from the first power signal over only the single set of 2 pairs of wires of the second communication cabling with a signature indicative that the third power signal supports consumption in excess of 13 watts; and
in the event that both the first power signal and the second power signal are detected as present, and the first power signal is detected as not supporting power consumption in excess of 13 watts, providing said third power signal derived from the first power signal and the second power signal over only the single set of 2 pairs of wires of the second communication cabling with a signature indicative that the third power signal supports consumption in excess of 13 watts.

* * * * *